(12) United States Patent
Kato (10) Patent No.: US 9,599,377 B2
(45) Date of Patent: Mar. 21, 2017

(54) HEAT PUMP APPARATUS

(71) Applicant: Mitsubishi Electric Corporation, Tokyo (JP)

(72) Inventor: Yohei Kato, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/425,915

(22) PCT Filed: May 16, 2013

(86) PCT No.: PCT/JP2013/063731
§ 371 (c)(1),
(2) Date: Mar. 4, 2015

(87) PCT Pub. No.: WO2014/054310
PCT Pub. Date: Apr. 10, 2014

(65) Prior Publication Data
US 2015/0219370 A1    Aug. 6, 2015

(30) Foreign Application Priority Data

Oct. 5, 2012 (WO) .................. PCT/JP2012/076007

(51) Int. Cl.
*F25B 27/00* (2006.01)
*F24D 12/02* (2006.01)
(Continued)

(52) U.S. Cl.
CPC ............. *F25B 27/00* (2013.01); *B29C 43/02* (2013.01); *B29C 43/18* (2013.01); *B29C 70/12* (2013.01);
(Continued)

(58) Field of Classification Search
CPC .......... F25B 49/02; F25B 27/00; F25B 30/02; F25B 30/06; B29C 70/46; B29C 70/12;
(Continued)

(56) References Cited

U.S. PATENT DOCUMENTS 4,325,228 A * 4/1982 Wolf ................... F24J 3/086
165/142
5,081,848 A * 1/1992 Rawlings ............... E01C 11/26
165/45

(Continued)

FOREIGN PATENT DOCUMENTS

EP    2287547 A1    2/2011
JP    08-261598 A    10/1996
(Continued)

OTHER PUBLICATIONS

Office Action issued Nov. 30, 2015 in the corresponding CN application No. 201380052028.3 (with English translation).
(Continued)

*Primary Examiner* — Mohammad M Ali
(74) *Attorney, Agent, or Firm* — Posz Law Group, PLC (57) ABSTRACT

Provided is a heat pump device configured to collect heat both from outside air and another heat source. A controller calculates heat exchange amounts with use of heat exchange performance of each of an air heat-source heat exchanger and an underground heat-source heat exchanger in addition to an outside air temperature and an underground temperature. Then, in switching between a simultaneous operation of causing refrigerant to flow through both of the air heat-source heat exchanger and the underground heat-source heat exchanger and a single operation of selecting the air heat-source heat exchanger or the underground heat-source heat exchanger to cause refrigerant to flow therethrough, the controller selects a heat source having a larger calculated (Continued)

heat exchange amount. In this manner, an appropriate heat source suitable for operation conditions can be selected.

7 Claims, 5 Drawing Sheets

(51) Int. Cl.

| | | |
|---|---|---|
| *F25B 49/02* | (2006.01) | |
| *F24D 15/04* | (2006.01) | |
| *F25B 30/02* | (2006.01) | |
| *F25B 30/06* | (2006.01) | |
| *B29C 43/02* | (2006.01) | |
| *B29C 43/18* | (2006.01) | |
| *B29C 70/46* | (2006.01) | |
| *B29C 70/12* | (2006.01) | |
| *B29C 70/40* | (2006.01) | |
| *B29C 70/30* | (2006.01) | |
| *B29C 70/42* | (2006.01) | |
| *B29K 101/12* | (2006.01) | |
| *B29K 105/08* | (2006.01) | |
| *B29K 77/00* | (2006.01) | |
| *B29K 307/04* | (2006.01) | |
| *B29K 309/08* | (2006.01) | |

(52) U.S. Cl.
CPC ............ *B29C 70/305* (2013.01); *B29C 70/40* (2013.01); *B29C 70/42* (2013.01); *B29C 70/46* (2013.01); *F24D 12/02* (2013.01); *F24D 15/04* (2013.01); *F25B 30/02* (2013.01); *F25B 30/06* (2013.01); *F25B 49/02* (2013.01); *B29K 2077/00* (2013.01); *B29K 2101/12* (2013.01); *B29K 2105/0872* (2013.01); *B29K 2307/04* (2013.01); *B29K 2309/08* (2013.01); *F24D 2200/11* (2013.01); *Y10T 428/24479* (2015.01); *Y10T 428/24628* (2015.01); *Y10T 428/24994* (2015.04)

(58) Field of Classification Search
CPC ....... B29C 70/305; F24D 12/02; F24D 15/04; F24D 2200/11; B29K 2101/12; B29K 2077/00; B29K 2307/04; B29K 2309/08; B29K 2105/0872; Y10T 428/24994; Y10T 428/24479; Y10T 428/24628

USPC ............................... 62/238.7, 175, 236, 260
See application file for complete search history.

(56) References Cited

U.S. PATENT DOCUMENTS

| | | | | |
|---|---|---|---|---|
| 5,261,251 | A | * 11/1993 | Galiyano | .............. F24F 5/0046 |
| | | | | 62/176.6 |
| 6,167,715 | B1 | * 1/2001 | Hebert | ..................... F24J 3/081 |
| | | | | 165/46 |
| 8,468,845 | B2 | * 6/2013 | Chordia | .................. F24J 3/081 |
| | | | | 62/260 |
| 2002/0174673 | A1 | * 11/2002 | Wilkinson | ................ F24D 5/12 |
| | | | | 62/260 |
| 2007/0044494 | A1 | 3/2007 | Ally et al. | |
| 2007/0246555 | A1 | * 10/2007 | Nishimura | ................ F24D 3/08 |
| | | | | 237/2 B |
| 2009/0272137 | A1 | * 11/2009 | Wiggs | ..................... F25B 13/00 |
| | | | | 62/260 |
| 2011/0042057 | A1 | 2/2011 | Li et al. | |

FOREIGN PATENT DOCUMENTS

| | | |
|---|---|---|
| JP | 2002-005547 A | 1/2002 |
| JP | 2003-207225 A | 7/2003 |
| JP | 2006-125769 A | 5/2006 |
| JP | 2008-164237 A | 7/2008 |
| JP | 2010-216783 A | 9/2010 |

OTHER PUBLICATIONS

Extended European Search Report issued Jun. 24, 2016 in the corresponding EP patent application No. 13843575.5.
Office Action issued Jul. 5, 2016 in the corresponding JP patent application No. 2014-539624 (with English translation).
Office Action issued Nov. 10, 2015 in the corresponding JP application No. 2014-539624 (with English translation).
International Search Report of the International Searching Authority mailed Aug. 6, 2013 for the corresponding international application No. PCT/JP2013/063731 (and English translation).
Office Action mailed Nov. 8, 2016 issued in corresponding JP patent application No. 2014-539624 (and English translation).

\* cited by examiner

FAN ROTATION SPEED    Nfan

FIG. 5

COMPRESSOR ROTATION SPEED    Ncomp

HEAT PUMP APPARATUS

CROSS REFERENCE TO RELATED APPLICATIONS

This application is a U.S. national stage application of PCT/JP2013/063731 filed on May 16, 2013, which claims priority to international application no. PCT/JP2012/076007, filed on Oct. 5, 2012, the contents of which are incorporated herein by reference.

TECHNICAL FIELD

The present invention relates to a heat pump apparatus using a plurality of heat sources.

BACKGROUND

In general, a heat pump apparatus to be used for a cooling and heating apparatus and a hot water supply device uses air as a heat source.

Further, in districts where an outside air temperature is low, a heat pump apparatus using underground heat in heating has also come to be used.

In an air heat-source heat pump apparatus using heat of air as a heat source, when an outside air temperature is low in a heating operation, a heating capacity may be reduced due to reduction in suction pressure, frosting, or the like. Thus, operation efficiency of the heat pump apparatus depends on the outside air temperature.

In an underground-thermal-energy heat pump apparatus using underground heat, when an underground temperature is higher than an outside air temperature, the amount of collected heat can be increased, and hence the operation efficiency is higher than that of the air heat-source heat pump apparatus. However, when the underground temperature is lower than the outside air temperature, conversely, the operation efficiency of the underground-thermal-energy heat pump apparatus is worse than that of the air heat-source heat pump apparatus.

Further, although the underground temperature less varies throughout the year as compared to the outside air temperature, the variation width of the underground temperature depends on the district, depth, and season. Also for this reason, the operation efficiency of the underground-thermal-energy heat pump apparatus may be worse than that of the air heat-source heat pump apparatus.

As a measure for solving those problems, in Patent Literature 1, there is disclosed a technology of switching between an air heat-source heat exchanger, which is installed on the ground to use outside air as a heat source, and an underground heat-source heat exchanger, which uses underground heat collected by an underground heat exchanger buried in the ground as a heat source. In Patent Literature 1, a passage is switched so that the air heat source exchanger may be used when an outside air temperature is equal to or higher than a predetermined value or when a refrigerant temperature is equal to or higher than a predetermined value (for example, equal to or higher than a temperature at which the air heat source exchanger is frosted) and that the underground heat-source heat exchanger may be used when the refrigerant temperature is equal to or lower than the predetermined value.

PATENT LITERATURE

Patent Literature 1: Japanese Unexamined Patent Application Publication No. 2010-216783 (FIGS. 1 and 4)

In the case where the underground heat-source heat exchanger or the air heat-source heat exchanger is used on a case-by-case basis as disclosed in Patent Literature 1, the underground heat exchanger buried in the ground and the air heat-source heat exchanger are designed in size to have the same processing capacity. In general, the size of the underground heat exchanger necessary for acquiring the same processing capacity is large as compared to the air heat-source heat exchanger, and further, construction cost, such as drilling work, is necessary because the underground heat exchanger needs to be buried in the ground. For this reason, the configuration of providing the underground heat exchanger having the same processing capacity as that of the air heat-source heat exchanger still leads to a significant increase in cost as compared to a heat pump apparatus including an air heat source or an underground heat source alone.

Accordingly, if heat is collected simultaneously from the outside air and the underground rather than being collected from one of the underground heat-source heat exchanger and the air heat-source heat exchanger on a case-by-case basis, a part of the amount of heat collected by the underground heat exchanger can be compensated for by the air heat-source heat exchanger. Thus, there is an advantage in that the necessary size of the underground heat exchanger can be reduced to suppress system cost.

However, in the configuration in which heat is collected simultaneously from the outside air and the underground, depending on operating conditions that, for example, an indoor load is small and an input of the compressor is small, system efficiency may be higher when heat is collected from one of the outside air and the underground than when heat is collected from both. Then, in this case, the selection of which of the air heat source and the underground heat source is used to increase the system efficiency is affected by heat exchanger performance determined based on the sizes of the air heat-source heat exchanger and the underground heat-source heat exchanger installed, the air volume passing through the air heat-source heat exchanger, the liquid flow rate circulating through the underground heat-source heat exchanger, and the like. Accordingly, for example, even if the outside air temperature is higher than the underground temperature, the system efficiency may be higher when the underground heat exchanger is used to collect heat. Thus, the selection of a heat source cannot be simply determined based only on the temperatures.

However, in Patent Literature 1, only the temperature conditions such as the refrigerant temperature and the heat source temperature (outside air temperature) are used to select which of the air heat source and the underground heat source the heat is collected from. Accordingly, the heat source may be used while the system efficiency remains low, thus failing to save energy.

Incidentally, in recent years, the underground heat as well as the outside air has come to be used as a heat source in the heat pump apparatus as described above, but the use of another heat source than the underground heat has been demanded.

SUMMARY

The present invention has been made in view of the above-mentioned circumstances, and it is an object thereof to obtain a heat pump apparatus configured to collect heat both from outside air and another heat source and capable of implementing an operation with high system efficiency throughout the year by selecting an appropriate heat source.

According to one embodiment of the present invention, there is provided a heat pump device, including a refrigerant circuit including a first circuit and a second circuit, the first circuit including: a compressor, a refrigerant passage of a use-side heat exchanger, a first pressure reducing device, and a first heat-source heat exchanger configured to use outside air serving as a first heat source as a heat source, the compressor, the refrigerant passage, the first pressure reducing device, and the first heat-source heat exchanger being sequentially connected, the second circuit including: a second pressure reducing device, and a refrigerant passage of a second heat-source heat exchanger, the refrigerant passage being connected in series to the second pressure reducing device, the second circuit being connected in parallel to the first pressure reducing device and the first heat-source heat exchanger of the first circuit, a heat exchange medium circuit including a heat exchange medium passage of the second heat-source heat exchanger, and configured to circulate therethrough a heat exchange medium serving as a second heat source, the second heat source being used to exchange heat with another heat source other than the outside air so as to receive heat of the another heat source; and a controller configured to switch between a simultaneous operation of causing refrigerant to flow through both of the first heat-source heat exchanger and the second heat-source heat exchanger and a single operation of selecting the first heat-source heat exchanger or the second heat-source heat exchanger to cause refrigerant to flow therethrough, in accordance with a heat exchange amount in each of the first heat-source heat exchanger and the second heat-source heat exchanger.

According to one embodiment of the present invention, an appropriate heat source is selected in consideration of, in addition to temperature conditions, heat exchange performance of each heat-source heat exchanger that reflects current operating conditions. Consequently, a heat pump apparatus capable of implementing an operation with high system efficiency throughout the year can be obtained.

DETAILED DESCRIPTION

Now, an embodiment of the present invention is described on the assumption that a system to which a heat pump apparatus is applied is an air-conditioning system configured to perform heating or cooling.

Figure 1:
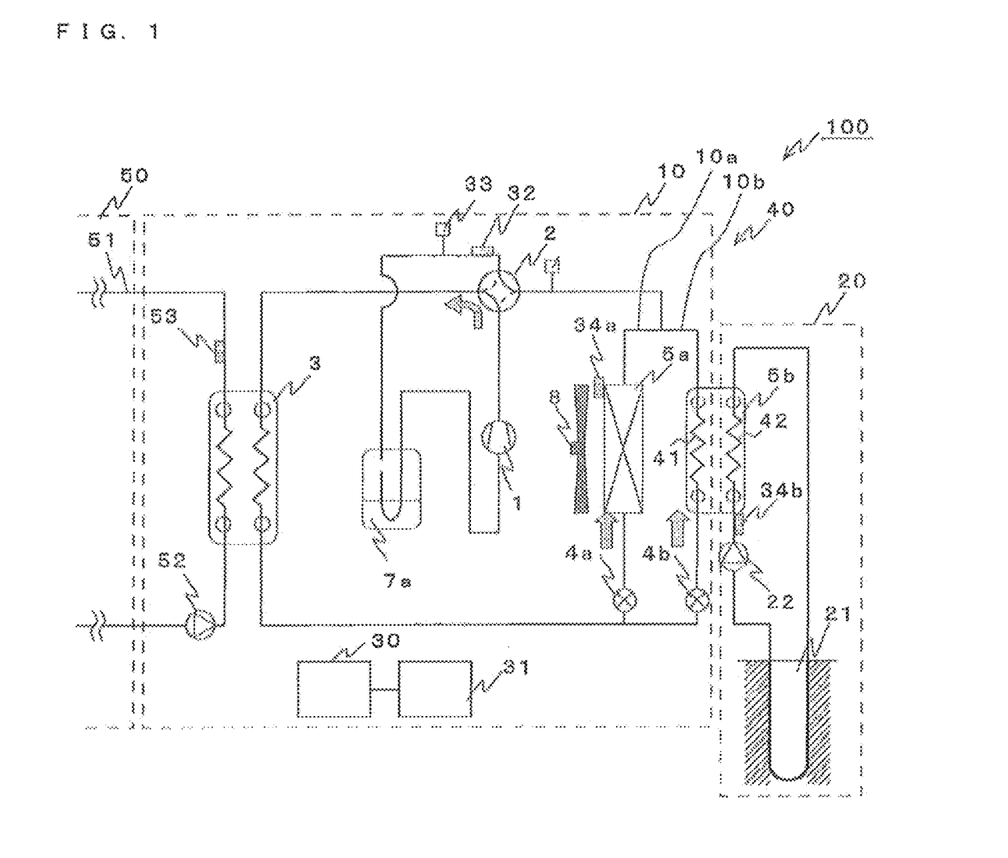
FIG. 1 is a diagram illustrating a refrigerant circuit of an air-conditioning system to which a heat pump apparatus is applied according to one embodiment of the present invention.

FIG. 1 is a diagram illustrating a refrigerant circuit of the air-conditioning system to which the heat pump apparatus is applied according to one embodiment of the present invention. The arrows in FIG. 1 represent the flow of refrigerant in a heating operation.

An air-conditioning system 100 includes a heat pump apparatus 40 and a use-side device 50. The use-side device 50 includes a use-side circuit 51 through which a use-side medium circulates, and performs heating or cooling by using the heat pump apparatus 40 as a heat source.

<<Heat Pump Apparatus>>

The heat pump apparatus 40 includes a refrigerant circuit 10 through which a refrigerant circulates, an underground heat source-side circuit 20, a controller 30, and a storage device 31, and is installed outdoors.

<Refrigerant Circuit>

The refrigerant circuit 10 includes a first circuit 10a in which a compressor 1, a four-way valve 2 configured to switch a passage of the refrigerant, a water heat exchanger 3 serving as a use-side heat exchanger, an expansion valve 4a serving as a first pressure reducing device, and an air heat-source heat exchanger 5a serving as a first heat-source heat exchanger are connected in this order by refrigerant pipes, and a second circuit 10b connected in parallel to a part of the first circuit 10a. The second circuit 10b is formed by connecting an expansion valve 4b serving as a second pressure reducing device and a refrigerant passage 41 of an underground heat-source heat exchanger 5b serving as a second heat-source heat exchanger in series, and is connected in parallel to the expansion valve 4a and the air heat-source heat exchanger 5a of the first circuit 10a.

(Compressor)

The compressor 1 is, for example, a fully hermetic compressor, and has a configuration in which an electric motor unit (not shown) and a compression unit (not shown) are housed in a compressor shell (not shown). Low-pressure refrigerant sucked into the compressor 1 is compressed, and discharged from the compressor 1 as high-temperature and high-pressure refrigerant. A rotation speed of the compressor 1 is controlled by the controller 30 via an inverter (not shown), and the compressor 1 thereby controls a capacity of the heat pump apparatus 40. In this case, the magnitude difference in pressure is not determined by the relationship with a reference pressure (numerical value), but is expressed based on a relative magnitude difference (including an intermediate level) in the refrigerant circuit 10 through pressurization by the compressor 1, control of an opening and closing state (opening degree) of each of the expansion valves 4a and 4b, and the like. The same holds true for the magnitude difference in temperature.

(Water Heat Exchanger)

The water heat exchanger 3 exchanges heat between a use-side medium (in this case, water) in the use-side circuit 51 of the use-side device 50 and refrigerant in the refrigerant circuit 10. In the use-side circuit 51, water is circulated by a pump 52. In the case of heating, the water heat exchanger 3 functions as a condenser, and generates warm water by heating the water with heat of the refrigerant in the refrigerant circuit 10. In the case of cooling, the water heat exchanger 3 functions as an evaporator, and generates cold water by cooling the water with cooling energy of the refrigerant in the refrigerant circuit 10. The warm water or the cold water is used to heat or cool the indoor space. Examples of the form of the heat exchanger include a plate type in which plates are stacked on one another and a double pipe type formed of a heat transfer pipe through which refrigerant flows and a heat transfer pipe through which water flows. Any type of the heat exchanger may be employed in this embodiment. Note that, the use-side medium that circulates through the use-side circuit 51 is not limited to water, and may be an antifreeze liquid, such as brine.

(Expansion Valve)

The expansion valve 4a adjusts the flow rate of refrigerant flowing through the air heat-source heat exchanger 5a. Further, the expansion valve 4b adjusts the flow rate of refrigerant flowing through the refrigerant passage 41 of the underground heat-source heat exchanger 5b. The opening degree of each of the expansion valves 4a and 4b is set so as to be variable based on a control signal from the controller 30. Each of the expansion valves 4a and 4b may be an electronic expansion valve whose opening degree is variable based on an electric signal, or may be of another type in which a plurality of orifices or capillaries are connected in parallel so that the flow rate of refrigerant flowing into the heat exchanger may be controlled based on an opening and closing operation of a solenoid value or the like.

(Air Heat-Source Heat Exchanger)

The air heat-source heat exchanger 5a is, for example, a fin-and-tube heat exchanger formed of copper or aluminum. The air heat-source heat exchanger 5a is a heat exchanger using air (outside air) as a heat source, and exchanges heat between the outside air supplied from a fan 8 and the refrigerant.

(Four-Way Valve)

The four-way valve 2 is used to switch the flow in the refrigerant circuit 10. Through the switching of the passage, the water heat exchanger 3 can be used as a condenser in a heating operation and used as an evaporator in a cooling operation.

<<Underground Heat Source-Side Circuit>>

The underground heat source-side circuit 20, which serves as a heat exchange medium circuit, is formed by connecting an underground heat source-side medium passage (heat exchange medium passage) 42 of the underground heat-source heat exchanger 5b, an underground heat exchanger 21 buried in the ground, and a geothermal heat pump 22 in this order by pipes. In the underground heat source-side circuit 20, an underground heat source-side medium serving as a heat exchange medium, which is an antifreeze liquid, such as brine, circulates so as to collect underground heat.

(Underground Heat Exchanger)

The underground heat exchanger 21, which serves as a heat-source heat exchanger for the underground heat-source heat exchanger 5b, is constructed by, for example, a group of resin-made heat collection pipes that are formed into a substantially U-shape and buried in the ground vertically or horizontally. Heat exchange performance of the underground heat exchanger 21 varies depending on the buried district and depth even when the group of heat collection pipes having the same dimensions is buried.

(Underground Heat-Source Heat Exchanger)

The underground heat-source heat exchanger 5b exchanges heat between the refrigerant circulating through the refrigerant circuit 10 and the underground heat source-side medium circulating through the underground heat source-side circuit 20. The underground heat source-side medium, which has collected the underground heat by the underground heat exchanger 21, flows into the underground heat source-side medium passage 42 of the underground heat-source heat exchanger 5b, and hence the heat collected from the underground by the underground heat exchanger 21 is transferred to the refrigerant on the refrigerant passage 41 side. In this manner, the refrigerant circuit 10 collects the underground heat. Similarly to the water heat exchanger 3, the underground heat-source heat exchanger 5b is constructed by a plate-type or double pipe-type heat exchanger, and any type of the heat exchanger may be employed.

<Controller>

Based on detection values from respective sensors, the controller 30 controls the rotation speed of the compressor 1, the rotation speed of the fan 8, the rotation speed of the geothermal heat pump 22, and the rotation speed of the pump 52 so that an indoor temperature may be a set temperature that is set by the use-side device 50. Further, the controller 30 controls the overall air-conditioning system, including the control of the switching of the four-way valve 2 and the processing of flowcharts of FIG. 7 to be described later.

<Storage Device>

The storage device 31 stores various kinds of information used for calculating the current heat exchange performance of each of the air heat-source heat exchanger 5a and the underground heat-source heat exchanger 5b. The various kinds of information are described later.

<Description of Sensors>

The heat pump apparatus 40 is equipped with temperature or pressure sensors as necessary. Detection values of the respective sensors are input to the controller 30, and used for operation control of the heat pump apparatus 40, capacity control of the compressor 1, for example, and opening degree control of the expansion valves 4a and 4b. In FIG. 1, the heat pump apparatus 40 includes an outside air temperature sensor 34a serving as a first heat source temperature detector, a geothermal heat temperature sensor 34b serving as a second heat source temperature detector, and a refrigerant temperature sensor 32 serving as a refrigerant temperature detector.

The outside air temperature sensor 34a detects a temperature of the outside air serving as a heat source. The geothermal heat temperature sensor 34b detects a temperature of the underground heat source-side medium that has exchanged heat with the underground by the underground heat exchanger 21 and been pumped by the geothermal heat pump 22. The refrigerant temperature sensor 32 detects a saturation temperature of the suction pressure in the refrigerant circuit 10. Note that, the refrigerant temperature sensor 32 may be a suction pressure sensor 33 configured to detect a pressure of the refrigerant on the suction side of the compressor 1 as illustrated in FIG. 1, and in this case, the refrigerant saturation temperature only needs to be converted from the refrigerant pressure by the controller 30.

(Refrigerant Movement in Normal Operation (Heating Operation))

Next, how the air-conditioning system 100 operates in the normal operation, in particular, in the heating operation according to this embodiment is described. In the heating operation, the four-way valve 2 is switched to the solid line side of FIG. 1.

Figure 2:
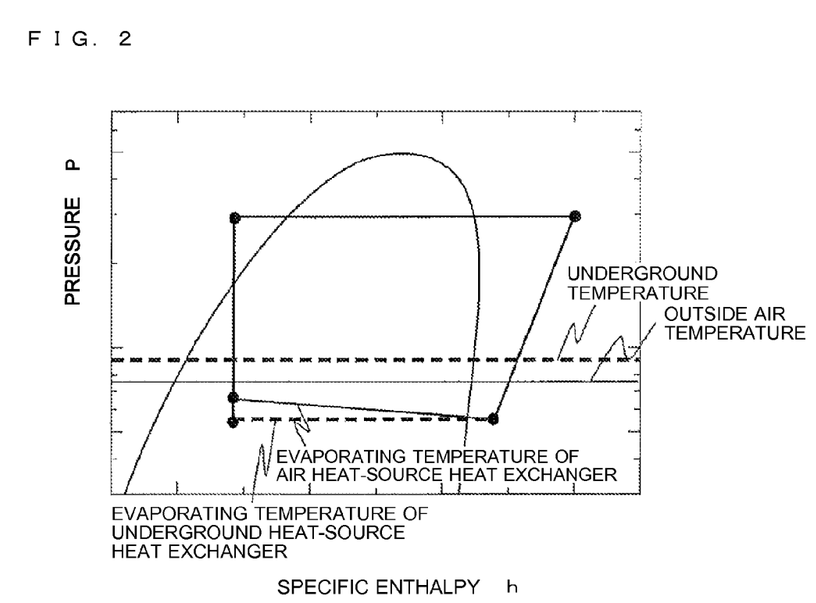
FIG. 2 is a graph showing a relationship between an operating state of the air-conditioning system of FIG. 1 in a heating operation and an outside air temperature and an underground temperature that are heat source temperatures.

FIG. 2 is a chart showing the relationship between the operating state of the air-conditioning system of FIG. 1 in the heating operation and an outside air temperature and an underground temperature that are heat source temperatures. In this case, the underground temperature is higher than the outside air temperature.

Low-temperature and low-pressure refrigerant is compressed by the compressor 1, and discharged therefrom as high-temperature and high-pressure refrigerant. The high-temperature and high-pressure refrigerant discharged from the compressor 1 passes through the four-way valve 2, which is switched for heating, and flows into the water heat exchanger 3 so as to transfer heat to water in the use-side circuit 51. The resultant low-temperature and high-pressure refrigerant obtained through the heat transfer to the water branches into two passages, and the respective refrigerant flows into the expansion valves 4a and 4b to be depressurized.

The refrigerant depressurized by the expansion valve 4a flows into the air heat-source heat exchanger 5a, is evaporated through heat reception from the outside air, and flows out from the air heat-source heat exchanger 5a. On the other hand, the refrigerant depressurized by the expansion valve 4b flows into the underground heat-source heat exchanger 5b, and receives heat through heat exchange with the underground heat source-side medium. Underground heat is collected through this heat exchange. Then, the refrigerant evaporated through the collection of the underground heat joins the refrigerant flowing out from the air heat-source heat exchanger 5a, and passes through the four-way valve 2 and a refrigerant container 7a again to be sucked into the compressor 1.

As described above, in the normal operation, a simultaneous operation of using both of the air heat source and the underground heat source is performed. However, operation efficiency may be higher when a single operation of using the air heat source or the underground heat source is performed. The switching between the simultaneous operation and the single operation is not a feature of the present invention, and hence the switching method is not particularly limited herein. In any case, the operation is switched to the one having higher operation efficiency in accordance with a switching determination criterion determined in advance. Then, the feature of the present invention resides in a selection method of selecting which of the air heat source and the underground heat source in performing the single operation. This selection method is described later. Note that, in the following description, the air heat-source heat exchanger 5a and the underground heat-source heat exchanger 5b each configured to exchange heat with the heat source are sometimes referred to collectively as "heat-source heat exchanger" unless otherwise required to be distinguished.

(Refrigerant Movement at Time of Selecting Air Heat Source (Heating Operation))

In the case of selecting the air heat source, the opening degree of the expansion valve 4a is controlled, the expansion valve 4b is closed, the geothermal heat pump 22 is stopped, and the fan 8 is operated. The refrigerant discharged from the compressor 1 passes through the four-way valve 2, which is switched for heating, and flows into the water heat exchanger 3 so as to transfer heat to the water serving as the use-side medium. The resultant high-pressure and low-temperature refrigerant is depressurized by the expansion valve 4a, and thereafter flows into the air heat-source heat exchanger 5a so as to receive heat from the outside air, with the result that the refrigerant is evaporated. Then, the refrigerant flowing out from the air heat-source heat exchanger 5a flows into the four-way valve 2 again, and thereafter passes through the refrigerant container 7a to be sucked into the compressor 1.

(Refrigerant Movement at Time of Selecting Underground Heat Source (Heating Operation))

In the case of selecting the underground heat source, the expansion valve 4a is closed, the opening degree of the expansion valve 4b is controlled, the geothermal heat pump 22 is driven, and the fan 8 is stopped. The refrigerant discharged from the compressor 1 passes through the four-way valve 2, which is switched for heating, and flows into the water heat exchanger 3 so as to transfer heat to the water serving as the use-side medium. The resultant high-pressure and low-temperature refrigerant is depressurized by the expansion valve 4b, and thereafter flows into the underground heat-source heat exchanger 5b.

On the other hand, in the underground heat source-side circuit 20, the underground heat source-side medium exchanges heat with the underground by the underground heat exchanger 21 to collect underground heat, and the underground heat source-side medium that has collected the underground heat flows into the underground heat-source heat exchanger 5b. Then, the refrigerant in the refrigerant circuit 10 collects the underground heat through heat exchange with the underground heat source-side medium by the underground heat-source heat exchanger 5b, and is evaporated. Then, the refrigerant flowing out from the underground heat-source heat exchanger 5b flows into the four-way valve 2 again, and thereafter passes through the refrigerant container 7a to be sucked into the compressor 1.

(Refrigerant Movement in Normal Operation (Cooling Operation))

Next, how the air-conditioning system 100 operates in the normal operation, in particular, in the cooling operation according to this embodiment is described. In the cooling operation, the four-way valve 2 is switched to the dotted line side of FIG. 1.

Figure 3:
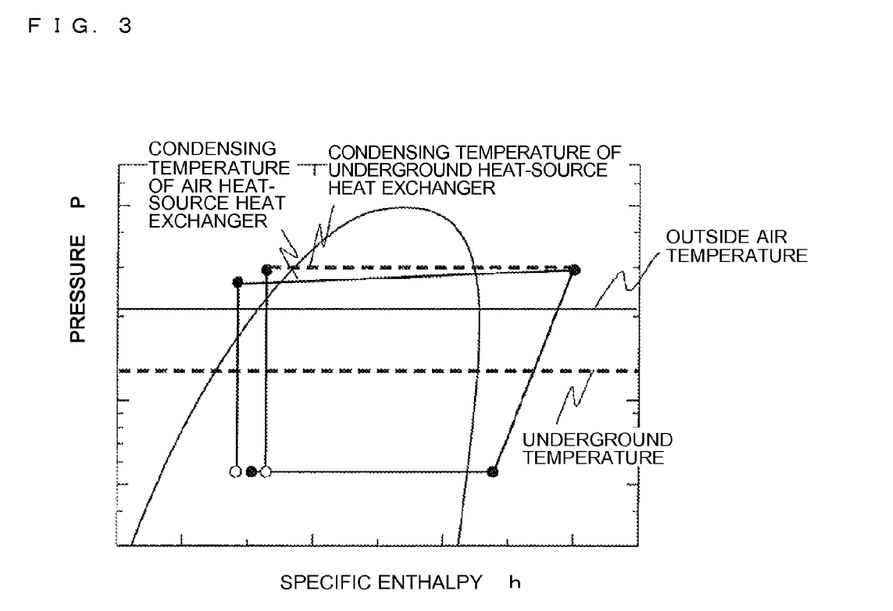
FIG. 3 is a graph showing a relationship between an operating state of the air-conditioning system of FIG. 1 in a cooling operation and the outside air temperature and the underground temperature that are the heat source temperatures.

FIG. 3 is a chart showing the relationship between the operating state of the air-conditioning system of FIG. 1 in the cooling operation and heat source temperatures (outside air temperature and underground temperature). In this case, the underground temperature is lower than the air temperature.

Low-temperature and low-pressure refrigerant is compressed by the compressor 1, and discharged therefrom as high-temperature and high-pressure refrigerant. The high-temperature and high-pressure refrigerant discharged from the compressor 1 passes through the four-way valve 2, which is switched for cooling, and thereafter branches into two passages. One refrigerant flows into the air heat-source heat exchanger 5a, and the other refrigerant flows into the underground heat-source heat exchanger 5b.

The refrigerant flowing into the air heat-source heat exchanger 5a transfers heat to the outside air to be low-temperature and high-pressure refrigerant. The low-temperature and high-pressure refrigerant flows out from the air heat-source heat exchanger 5a, and flows into the expansion valve 4a to be depressurized. On the other hand, the refrigerant flowing into the underground heat-source heat exchanger 5b transfers heat to the underground heat source-side medium to be low-temperature and high-pressure refrigerant. The low-temperature and high-pressure refrigerant flows out from the underground heat-source heat exchanger 5b, and flows into the expansion valve 4b to be depressurized. Then, the refrigerant depressurized by the expansion valve 4b joins the refrigerant depressurized by the expansion valve 4a, and flows into the water heat exchanger 3. The refrigerant flowing into the water heat exchanger 3 is evaporated through heat reception from the water in the use-side circuit 51, and passes through the four-way valve 2 and the refrigerant container 7a to be sucked into the compressor 1 again.

(Heat Source Switching Control Method)

Next, a method of selecting a heat source according to this embodiment is described. In this embodiment, a heat exchange amount in each of the heat-source heat exchangers is calculated, and a heat-source heat exchanger having a larger heat exchange amount is selected. Thus, the heat exchange amount in each of the heat-source heat exchangers needs to be calculated. A description is now given of the case of the heating operation, that is, the case where the heat-source heat exchanger is used as a heat receiver.

(Heat Exchange Amount $Q_a$ in Air Heat-Source Heat Exchanger)

In the heating operation, the air heat-source heat exchanger 5a functions as an evaporator. The air heat-source heat exchanger 5a involves condensation in wet air (wet surface) in many cases, but the case where the surface of the heat exchanger on the air side does not involve condensation (dry surface) is described herein for simplicity.

A heat exchange amount $Q_a$ of the air heat-source heat exchanger 5a can be expressed by Expression (1) with use of an air volume $G_a$ passing through the air heat-source heat exchanger 5a, specific heat $C_{pa}$ of air, air-side temperature efficiency $\epsilon_a$, the outside air temperature $T_{aoi}$ detected by the outside air temperature sensor 34a, and a refrigerant saturation temperature $T_s$ detected by the refrigerant temperature sensor 32.

[Math. 1]

$$Q_a = G_a \cdot C_{pa} \cdot \epsilon_a \cdot (T_{aoi} - T_s) \quad (1)$$

Provided that the refrigerant side has a saturation temperature and there is no temperature change in the flow direction inside the pipe, the air-side temperature efficiency $\epsilon_a$ can be expressed by Expression (2) with use of an air-side heat transfer area $A_o$ and an overall heat transfer coefficient $K_a$ of the air heat-source heat exchanger 5a.

[Math. 2]

$$\varepsilon_a = 1 - \exp\left(-\frac{A_o \cdot K_a}{G_a \cdot C_{pa}}\right) \quad (2)$$

The overall heat transfer coefficient $K_a$ has a proportional relationship with an air-side heat transfer coefficient $\alpha_o$ and a refrigerant-side heat transfer coefficient $\alpha_i$ as shown in Expression (3). Then, the air-side heat transfer coefficient $\alpha_o$ is proportional to the air volume $G_a$, and the refrigerant-side heat transfer coefficient $\alpha_i$ is proportional to a refrigerant flow velocity $V_{ref}$.

[Math. 3]

$$K_a \propto \frac{1}{\alpha_o} + \frac{1}{\alpha_i} \quad (3)$$

Figure 4:
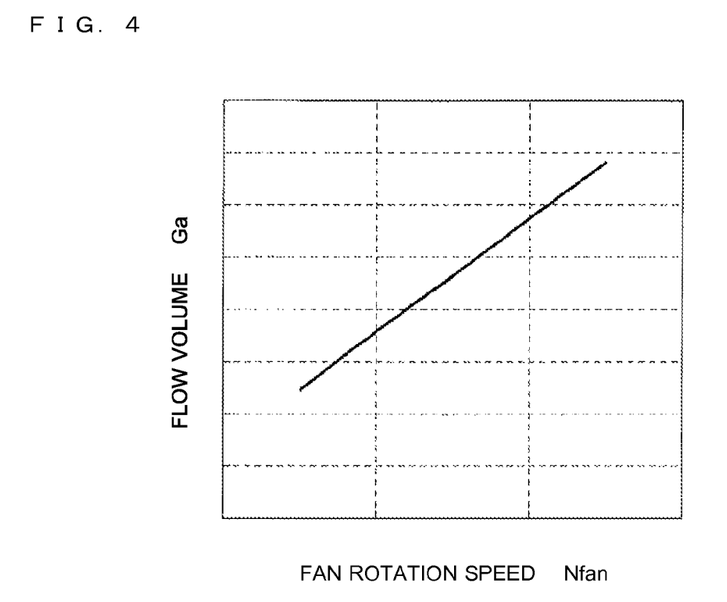
FIG. 4 is a graph showing a relationship between a fan rotation speed and an air volume in the air-conditioning system of FIG. 1.
Figure 5:
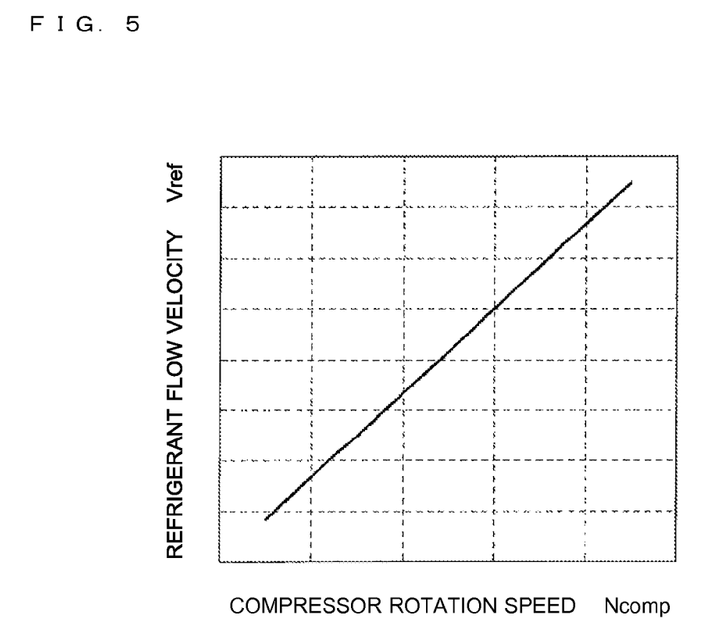
FIG. 5 is a graph showing a relationship between a compressor rotation speed and a refrigerant flow rate in the air-conditioning system of FIG. 1.

Further, in general, the air volume $G_a$ has a relationship as shown in FIG. 4, for example, with a rotation speed $N_{fan}$ of the fan 8, and the refrigerant flow velocity $V_{ref}$ has a relationship as shown in FIG. 5, for example, with a compressor rotation speed $N_{comp}$.

For this reason, the relationship between the fan rotation speed $N_{fan}$ and the air volume $G_a$ shown in FIG. 4, the relationship between the compressor rotation speed $N_{comp}$ and the refrigerant flow velocity $V_{ref}$ shown in FIG. 5, the relationship between the air volume $G_a$ and the air-side heat transfer coefficient $\alpha_o$, and the relationship between the refrigerant flow velocity $V_{ref}$ and the refrigerant-side heat transfer coefficient $\alpha_i$ are grasped in advance and stored in the storage device 31. Then, $G_a \cdot C_{pa} \cdot \epsilon_a$, which represents heat exchange performance of the air heat-source heat exchanger 5a, can be calculated by the controller 30 with use of those relationships and the current fan rotation speed $N_{fan}$ and compressor rotation speed $N_{comp}$.

Figure 6:
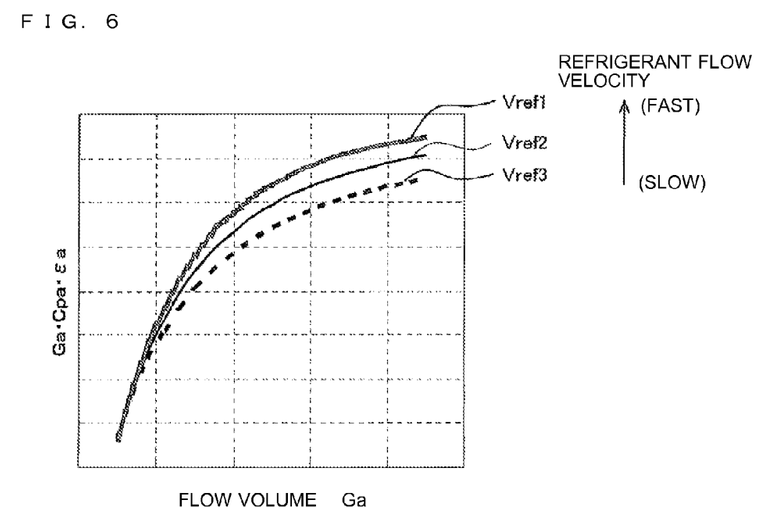
FIG. 6 is a graph showing a relationship between the air volume and heat exchanger performance in the air-conditioning system of FIG. 1.

Note that, instead of storing the relationship between the air volume $G_a$ and the air-side heat transfer coefficient $\alpha_o$ and the relationship between the refrigerant flow velocity $V_{ref}$ and the refrigerant-side heat transfer coefficient $\alpha_i$, the following may be employed. Specifically, as shown in FIG. 6, a relationship between the air volume $G_a$ and $G_a \cdot C_{pa} \cdot \epsilon_a$ is stored for each of the refrigerant flow velocities $V_{ref1}$, $V_{ref2}$, $V_{ref3}$, . . . . Then, $G_a \cdot C_{pa} \cdot \epsilon_a$ may be determined with use of this relationship, the air volume $G_a$ determined from FIG. 4, and the refrigerant flow velocity $V_{ref}$ determined from FIG. 5. Note that, it is understood from FIG. 6 that the heat exchange performance is enhanced as the refrigerant flow velocity $V_{ref}$ becomes higher, provided that the air volume $G_a$ is the same.

Then, by substituting the heat exchanger performance $G_a \cdot C_{pa} \cdot \epsilon_a$ calculated by the controller 30, the outside air temperature $T_{aoi}$, and the refrigerant saturation temperature $T_s$ into Expression (1), the heat exchange amount $Q_a$ in the air heat-source heat exchanger 5a can be calculated.

Note that, as is generally known, the refrigerant-side heat transfer coefficient $\alpha_i$ is sufficiently larger than the air-side heat transfer coefficient $\alpha_o$. Accordingly, the overall heat transfer coefficient $K_a$ is dominated by the air side as is apparent from Expression (3). Thus, if the air-side heat transfer coefficient $\alpha_o$ is grasped, the overall heat transfer coefficient $K_a$ can be roughly determined. In this embodiment, in the determination of the necessity of the addition of a heat source to be described later, the compressor rotation speed, the refrigerant flow velocity, and the refrigerant-side heat transfer coefficient are taken into consideration. However, for example, in the case where the determination needs to be simplified, even if the refrigerant-side parameters are neglected but only the air-side parameters are used (that is, the fan rotation speed $N_{fan}$, the air volume $G_a$, and the air-side heat transfer coefficient $\alpha_o$ are used), the necessity of the addition of a heat source can roughly be determined.

(Heat Exchange Amount $Q_g$ in Underground Heat-Source Heat Exchanger)

Next, a method of calculating a heat exchange amount $Q_g$ in the underground heat-source heat exchanger 5b is described. The basic concept is the same as that of the air side. The heat exchange amount $Q_g$ of the underground heat-source heat exchanger 5b can be expressed by Expression (4) with use of a flow rate $G_g$ of the underground heat source-side medium (in this case, brine) circulating through the underground heat-source heat exchanger 5b, specific heat $C_{pg}$ of brine, brine-side temperature efficiency $\epsilon_g$, an inflow brine temperature $T_{goi}$ detected by the geothermal heat temperature sensor 34b, and the refrigerant saturation temperature $T_s$ detected by the refrigerant temperature sensor 32. Note that, in this case, the following calculation is performed on the assumption that the underground temperature is the inflow brine temperature.

[Math. 4]

$$Q_g = G_g \cdot C_{pg} \cdot \epsilon_g \cdot (T_{goi} - T_s) \quad (4)$$

Further, the brine-side temperature efficiency $\epsilon_g$ can be expressed by Expression (5) with use of a heat transfer area $A_g$ and an overall heat transfer coefficient $K_g$ of the heat exchanger, and the overall heat transfer coefficient $K_g$ can be expressed by Expression (6) with use of a brine-side heat transfer coefficient $\alpha_g$ and a refrigerant-side heat transfer coefficient $\alpha_{ig}$.

[Math. 5]

$$\epsilon_g = 1 - \exp\left(-\frac{A_g \cdot K_g}{G_g \cdot C_{pa}}\right) \quad (5)$$

[Math. 6]

$$K_g \propto \frac{1}{\alpha_g} + \frac{1}{\alpha_{ig}} \quad (6)$$

Similarly to the air heat-source heat exchanger 5a, the brine-side heat transfer coefficient $\alpha_g$ is proportional to a pump rotation speed $N_{pump}$, and the refrigerant-side heat transfer coefficient $\alpha_{ig}$ is proportional to a refrigerant flow velocity $V_{refg}$. For this reason, the relationship between the pump rotation speed $N_{pump}$ and the brine flow rate $G_g$, the relationship between the compressor rotation speed $N_{comp}$ and the refrigerant flow velocity $V_{refg}$, the relationship between the brine flow rate $G_g$ and the refrigerant-side heat transfer coefficient $\alpha_{ig}$, and the relationship between the refrigerant flow velocity $V_{refg}$ and the refrigerant-side heat transfer coefficient $\alpha_{ig}$ are grasped in advance and stored in the storage device 31. Then, $G_g \cdot C_{pg} \cdot \epsilon_g$, which represents heat exchanger performance of the underground heat-source heat exchanger 5b, can be calculated by the controller 30 with use of those relationships and the current pump rotation speed $N_{pump}$ and compressor rotation speed $N_{comp}$.

Note that, instead of storing the relationship between the brine flow rate $G_g$ and the brine-side heat transfer coefficient $\alpha_g$ and the relationship between the refrigerant flow velocity $V_{refg}$ and the refrigerant-side heat transfer coefficient $\alpha_{ig}$, the following may be employed. Specifically, a relationship between the brine flow rate $G_g$ and $G_g \cdot C_{pg} \cdot \epsilon_g$ is stored for each refrigerant flow velocity $V_{refg}$. Then, $G_g \cdot C_{pg} \cdot \epsilon_g$ may be determined based on this relationship, the brine flow rate $G_g$ determined from the pump rotation speed $N_{pump}$, and the refrigerant flow velocity $V_{refg}$ determined from the compressor rotation speed $N_{comp}$.

Then, by substituting the heat exchanger performance $G_g \cdot C_{pg} \cdot \epsilon_g$ calculated by the controller 30, the inflow brine temperature $T_{goi}$, and the refrigerant saturation temperature $T_s$ into Expression (4), the heat exchange amount $Q_g$ in the underground heat-source heat exchanger 5b can be calculated.

(Relationship Between Heat Exchange Amount and Refrigerant Saturation Temperature)

When it is supposed that the heat exchange amounts $Q_a$ and $Q_g$ do not vary in Expression (1) and Expression (4), a temperature difference between the heat source temperature (outside air temperature $T_{aoi}$, inflow brine temperature $T_{goi}$) and the refrigerant saturation temperature $T_s$ becomes smaller as the heat exchanger performance ($G_a \cdot C_{pa} \cdot \epsilon_a$, $G_g \cdot C_{pg} \cdot \epsilon_g$) becomes higher. Specifically, in the case of heating, the heat-source heat exchanger functions as an evaporator and the refrigerant saturation temperature $T_s$ is lower than the outside air temperature $T_{aoi}$, and hence the refrigerant saturation temperature $T_s$ rises as the heat exchanger performance becomes higher. On the other hand, in the case of cooling, the heat-source heat exchanger functions as a condenser and the refrigerant saturation temperature $T_s$ is higher than the inflow brine temperature $T_{goi}$, and hence the refrigerant saturation temperature $T_s$ falls as the heat exchanger performance becomes higher.

Accordingly, for example, in the case of $Q_a > Q_g$ in the heating operation, if the amount of heat collected from the geothermal heat source is increased so as to acquire the same heat exchange amount as that on the air heat source side by the underground heat-source heat exchanger 5b under current operating conditions (compressor rotation speed $N_{comp}$, pump rotation speed $N_{pump}$, fan rotation speed $N_{fan}$), the refrigerant saturation temperature $T_s$ needs to be decreased. Then, in the case of heating, the operation efficiency of the heat pump becomes higher as the refrigerant temperature becomes higher. Accordingly, if the refrigerant saturation temperature $T_s$ is decreased so as to increase the heat exchange amount, the operation efficiency of the heat pump decreases. Note that, in the case of cooling, the operation efficiency of the heat pump becomes higher as the refrigerant temperature becomes lower. Thus, it can be said that the operation efficiency of the heat pump is higher when a heat source having a larger heat exchange amount calculated from Expressions (1) and (2) is used.

(Heat Source Switching Control Flow)

Figure 7:
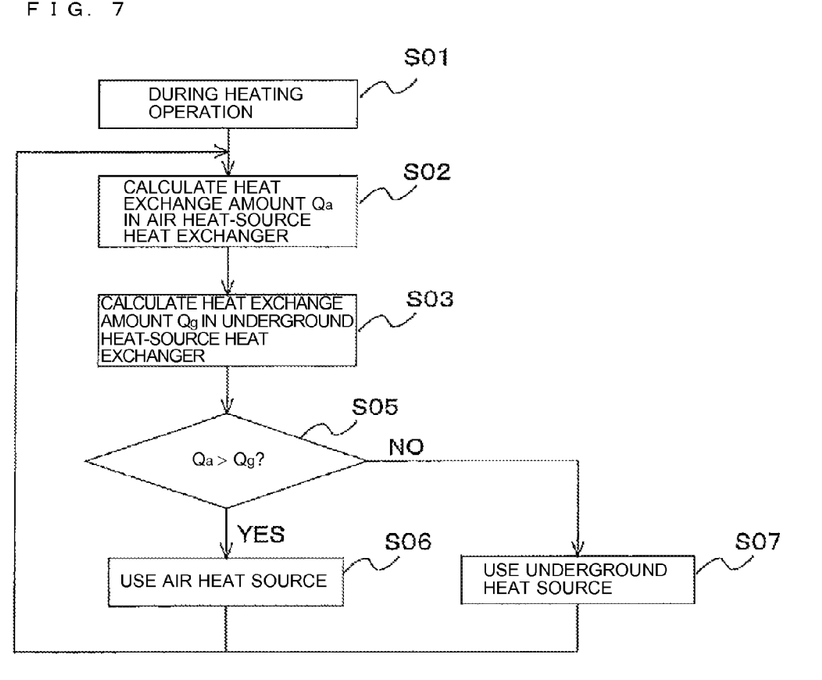
FIG. 7 is a flowchart illustrating a heat source selection control operation in the air-conditioning system of FIG. 1.

FIG. 7 is a flowchart illustrating a method of switching a heat source by using heat exchange amounts in the air-conditioning system of FIG. 1. Now, the method of switching a heat source is described with reference to the flow illustrated in FIG. 7.

First, during the heating operation (S01), the controller 30 calculates the air heat-source heat exchange amount $Q_a$ and the underground heat-source heat exchange amount $Q_g$ (S02, S03). The calculation method is as described above, and the heat exchange performance is calculated based on the fan rotation speed $N_{fan}$, the compressor rotation speed $N_{comp}$, and the brine pump rotation speed. Then, based on the current outside air temperature $T_{aoi}$, inflow brine temperature $T_{goi}$, and refrigerant saturation temperature $T_s$, the heat exchange amount $Q_a$ in the air heat-source heat exchanger 5a and the heat exchange amount $Q_g$ in the underground heat-source heat exchanger 5b are calculated from Expression (1) and Expression (4).

Then, the controller 30 compares the magnitude of the heat exchange amount $Q_a$ and the magnitude of the heat exchange amount $Q_g$ (S05), and when $Q_a$ is larger than $Q_g$, only the air heat source is used (S06). On the other hand, when $Q_a$ is equal to or smaller than $Q_g$, the underground heat source is used (S07).

After the selection of the heat source to be used is finished, the operation is performed with the selected heat source, and the selection of a heat source is started again in consideration of the operating conditions.

SPECIFIC EXAMPLES

Next, specific examples in the heat source selection flow are described by using numerals.

First, a description is given of the case where it is better to still continue the heat source that is currently used.

(Use of underground heat source→outside air temperature<underground temperature→use of underground heat source . . . )

It is assumed that the outside air temperature is 4 degrees C., the underground temperature (inflow brine temperature) is 5 degrees C., and the refrigerant temperature is 3 degrees C., and the underground heat-source heat exchanger 5b is currently used in the single operation. Further, it is assumed that air-side heat exchange performance and performance of the underground heat-source heat exchanger 5b calculated based on the current operating conditions are 2 and 5, respectively.

In this case, the heat exchange amount $Q_g$ in the underground heat-source heat exchanger 5b is as follows.

$$Q_g=5\times(5-3)=10$$

On the other hand, the heat exchange amount $Q_a$ in the air heat-source heat exchanger 5a is as follows.

$$Q_a=2\times(4-3)=1$$

Note that, because the underground heat-source heat exchanger 5b is currently used in the single operation, the fan 8 is stopped. Accordingly, the calculation of the heat exchange amount $Q_a$ means the calculation of the heat exchange amount $Q_a$ to be measured when the fan 8 is temporarily operated, and a fan rotation speed set in advance is used as the fan rotation speed for the calculation. The fan rotation speed may be fixed to a given value, or may be varied in accordance with the compressor rotation speed or the outside air temperature. The compressor rotation speed and the outside air temperature can be acquired as the current information, and hence if the fan rotation speed at the moment is determined, the heat exchange amount $Q_a$ to be measured when the fan 8 is temporarily operated can be estimated.

The heat exchange amount $Q_g$ in the underground heat-source heat exchanger 5b in the case where the air heat-source heat exchanger 5a is used in the single operation can be estimated through the same approach. Specifically, the calculation of the heat exchange amount $Q_g$ means the calculation of the heat exchange amount $Q_g$ to be measured when the geothermal heat pump 22 is temporarily operated. The pump rotation speed used for the calculation may have a fixed value set in advance, or may be varied in accordance with the underground temperature.

Then, in this case, the results of the calculation are $Q_a<Q_g$, and it follows that the heat exchange amount that can be collected at the same refrigerant temperature is larger in the underground heat source. Accordingly, the heat pump apparatus 40 can be operated with higher efficiency when only the underground heat-source heat exchanger 5b is continued to be used.

(Use of underground heat source→outside air temperature<underground temperature→use of air heat source . . . )

Next, a description is given of the case where it is better to perform the operation with the outside air used as a heat source even though the outside air temperature is lower than the underground temperature. Similarly to the above, it is assumed that the outside air temperature is 4 degrees C., the underground temperature is 5 degrees C., and the refrigerant temperature is 3 degrees C., and the underground heat-source heat exchanger 5b is currently used in the single operation. In this case, it is assumed that the air-side heat exchanger performance and the underground heat-source heat exchanger performance calculated based on the current operating conditions are 5 and 2, respectively.

In this case, the heat exchange amount $Q_g$ in the underground heat-source heat exchanger 5b is as follows.

$$Q_g=2\times(5-3)=4$$

On the other hand, the heat exchange amount $Q_a$ in the air heat-source heat exchanger 5a is as follows.

$$Q_a=5\times(4-3)=5$$

In other words, $Q_a>Q_g$ is established, and hence the air heat source can collect a larger heat exchange amount at the same refrigerant temperature. Accordingly, the heat pump apparatus 40 can be operated with higher operation efficiency when the heat source is switched from the underground heat source to the air heat source than when the underground heat-source heat exchanger 5b is continued to be used.

As described above, the heat exchanger performance of each heat-source heat exchanger is also taken into consideration for selecting a heat source to be used. Consequently, a truly effective heat source in view of the reduction in operation efficiency can be accurately determined.

Note that, the heat exchange amount $Q_a$ in the air heat-source heat exchanger 5a and the heat exchange amount $Q_g$ in the underground heat-source heat exchanger 5b may be calculated based on the opening degrees of the expansion valves (expansion valve 4a, expansion valve 4b).

For example, the case is considered where refrigerant-side outlet temperatures of the respective heat-source heat exchangers (air heat-source heat exchanger 5a, underground heat-source heat exchanger 5b) are controlled by the respective expansion valves with the same outlet refrigerant superheat degree. When it is supposed that a pressure loss at the expansion valve is dominant, it can be said that a larger amount of refrigerant flows to an expansion valve having a larger opening degree. In other words, it can be said that a larger heat exchange amount is processed with an expansion valve having a larger opening degree. Accordingly, the magnitude difference of the heat exchange amounts can be determined based on the magnitude difference of the opening degrees of the expansion valves.

The outlet refrigerant superheat degree (SH) of each heat-source heat exchanger can be calculated based on an outlet refrigerant temperature of each heat-source heat exchanger and an outlet saturation temperature of each heat-source heat exchanger. Specifically, a saturation pressure of the refrigerant is measured at an outlet of each heat-source heat exchanger, and the outlet saturation temperature is determined based on the saturation pressure. Then, a temperature of the refrigerant is measured at the outlet of each heat-source heat exchanger, and the measured temperature is subtracted from the outlet saturation temperature, to thereby calculate the outlet refrigerant superheat degree (SH). Then, the magnitudes of the calculated outlet refrigerant superheat degrees are compared to determine the magnitude difference of the heat exchange amounts.

In the normal case, the opening degree of the expansion valve is controlled based on the outlet refrigerant superheat degree of each heat-source heat exchanger calculated by the controller 30. For this reason, the controller 30 can determine the magnitude difference of the heat exchange amounts in the respective heat-source heat exchangers by comparing the magnitude difference of the opening degrees of the expansion valves. Because the magnitude difference of the heat exchange amounts can be determined in this manner, information such as performance of each heat-source heat exchanger is unnecessary. Accordingly, the magnitude difference of the heat exchange amounts in the respective heat-source heat exchangers can be easily determined based on the opening degree information of the expansion valves and the refrigerant temperature. However, if the refrigerant has not become a superheated gas at the outlets of the expansion valves, the magnitude difference of the heat exchange amounts cannot be accurately determined.

Note that, in order to detect the outlet refrigerant temperature of each heat-source heat exchanger, it is preferred to mount an outlet refrigerant temperature detector at the outlet of each heat-source heat exchanger. Further, in order to detect the outlet saturation temperature of each heat-source heat exchanger, it is preferred to mount an outlet saturation temperature detector at the outlet of each heat-source heat exchanger. As the outlet saturation temperature detector, a suction pressure sensor 33 can be used.

Further, a heat exchange amount $Q_{s2}$ in the air heat-source heat exchanger 5a and a heat exchange amount $Q_{s1}$ in the underground heat-source heat exchanger 5b may be calculated based on an outlet/inlet temperature of the use-side heat exchanger (water heat exchanger 3) and a heat source outlet/inlet temperature of one of the heat-source heat exchangers (air heat source-side exchanger 5a or underground heat-source heat exchanger 5b).

First, the controller 30 calculates a use-side capacity $Q_l$ based on an outlet/inlet temperature of the use-side heat medium flowing through the use-side circuit 51 at the use-side heat exchanger (water heat exchanger 3) and the flow rate of the use-side heat medium flowing through the use-side circuit 51. Next, the controller 30 calculates an input $W_{comp}$ of the compressor 1. The input $W_{comp}$ can be calculated, for example, by using the rotation speed of the compressor 1 and the magnitude difference in pressure (between the discharged refrigerant pressure and the sucked refrigerant pressure), by directly measuring the input of the compressor 1, or by measuring a current value supplied to the compressor 1. Then, $Q_l$ and $W_{comp}$ are used to determine a sum $Q_s$ of the heat exchange amounts on the heat source side.

In the case of the heating operation, the sum $Q_s$ is determined by $Q_s=Q_l-W_{comp}$.

In the case of the cooling operation, the sum $Q_s$ is determined by $Q_s=Q_l+W_{comp}$.

Then, the controller 30 calculates the heat source-side heat exchange amount $Q_{s1}$ based on an outlet/inlet temperature of the underground heat-source heat exchanger 5b and the flow rate of the underground heat source-side medium flowing through the underground heat source-side circuit 20. The sum $Q_s$ of the heat source-side heat exchange amounts, the heat exchange amount $Q_{s2}$ in the air heat-source heat exchanger 5a, and the heat exchange amount $Q_{s1}$ in the underground heat-source heat exchanger 5b have the following relationship.

$$Q_s=Q_{s1}+Q_{s2}$$

Accordingly, if $Q_s$ and $Q_{s1}$ can be known, the heat exchange amount $Q_{s2}$ in the air heat-source heat exchanger 5a can be calculated. Thus, the controller 30 can determine the magnitude difference of the heat exchange amount $Q_{s2}$ in the air heat-source heat exchanger 5a and the heat exchange amount $Q_{s1}$ in the underground heat-source heat exchanger 5b.

With this configuration, even if any one of the sensors on the air side or the geothermal side cannot be used, both the heat exchange amounts can be calculated. Further, if the heat exchange amount $Q_{s2}$ in the air heat-source heat exchanger 5a is calculated and used, the calculation accuracy of the heat source-side heat exchange amounts is improved because the outlet/inlet temperature of the underground heat source-side medium and the flow rate of the underground heat source-side medium of the geothermal heat pump 22 are apparent. Note that, the number of sensors to be used is increased, and hence the cost is increased correspondingly. Further, if individual variations of a plurality of sensors are large, an error is liable to be large.

As described above, in this embodiment, a heat source is selected in consideration of, in addition to the temperature conditions (heat source temperatures (outside air temperature and underground temperature) and refrigerant temperature), the heat exchange performance of each heat-source heat exchanger that reflects the current operating conditions (fan rotation speed $N_{fan}$, compressor rotation speed $N_{comp}$, pump rotation speed $N_{pump}$). Consequently, a heat source that is suitable for the current operating conditions can be selected for the single operation, and, by appropriately performing the simultaneous operation in accordance with the switching determination criterion determined in advance, the heat pump apparatus 40 can be operated with high efficiency throughout the year to suppress power consumption.

In this manner, because the method of selecting a heat source in consideration of the heat exchange performance of each heat-source heat exchanger is employed, even if the outside air temperature is lower than the underground temperature, the air heat-source heat exchanger 5a is used when the heat exchange amount in the air heat-source heat exchanger 5a is larger than that in the underground heat-source heat exchanger 5b. Consequently, as compared to the related-art system configured to select a heat source based only on the temperature conditions, an appropriate heat source in view of energy saving can be selected to suppress power consumption.

Further, because the method of selecting a heat source in consideration of the heat exchange performance of each heat-source heat exchanger is employed, even if the underground temperature is lower than the air temperature, the underground heat-source heat exchanger 5b is used when the heat exchange amount in the underground heat-source heat exchanger 5b is larger than that in the air heat-source heat exchanger 5a. Consequently, as compared to the related-art system configured to select a heat source based only on the temperature conditions, an appropriate heat source in view of energy saving can be selected to suppress power consumption.

Note that, in each embodiment described above, a description has been given of an example of using underground heat as a heat source other than the outside air. However, the heat source is not limited to the underground heat, and may be, for example, groundwater, seawater, river water, solar-heated water, a boiler, or the like.

Further, in the above-mentioned embodiment, the configuration including the four-way valve 2 has been described. However, the four-way valve 2 is not necessarily required, and may be omitted.

Further, in each embodiment, a description has been given of an example of the air-conditioning system as an apparatus to which the heat pump apparatus 40 is applied. However, the present invention is not limited thereto, and a hot water supply system may be employed. In other words, the present invention is applicable to a system configured to perform a heating operation in which refrigerant circulates so that the use-side heat exchanger (water heat exchanger 3) may function as a radiator and the air heat-source heat exchanger 5a may function as an evaporator.

Figure 8:
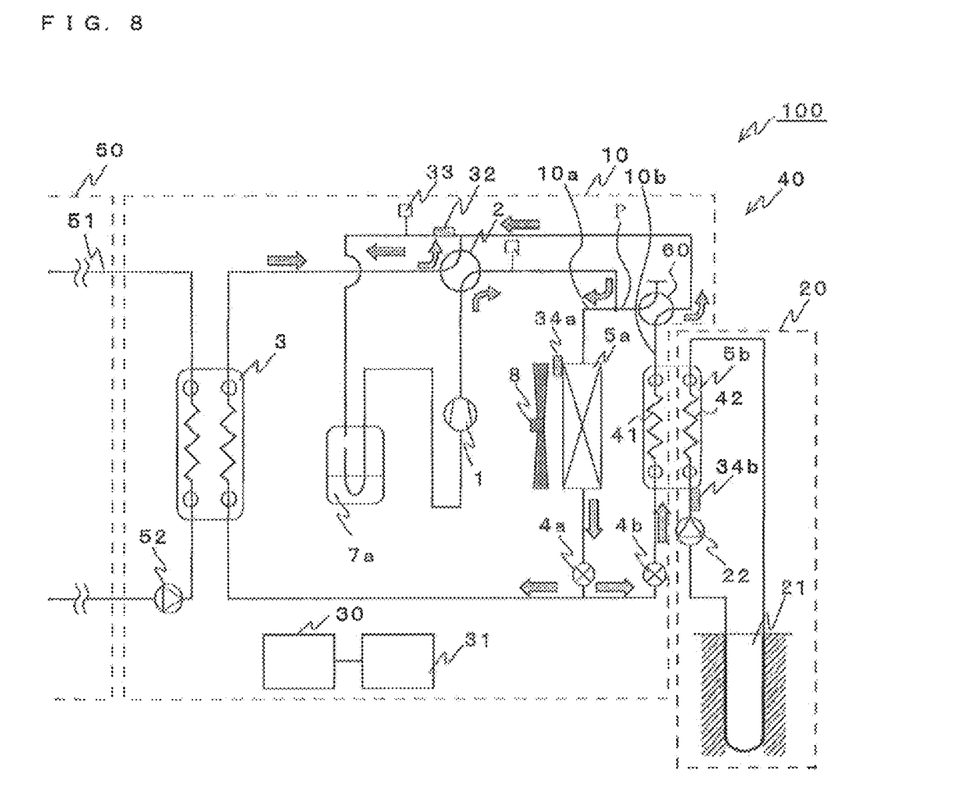
FIG. 8 is a diagram illustrating a modified example of the refrigerant circuit in the air-conditioning system of FIG. 1.

Further, the refrigerant circuit 10 is not limited to the illustrated configuration, and may include a three-way valve 60 as illustrated in FIG. 8. The three-way valve 60 is arranged between a junction P at which respective flows of refrigerant flowing out from the air heat-source heat exchanger 5a and the underground heat-source heat exchanger 5b join each other in the heating operation and the underground heat-source heat exchanger 5b. Then, the three-way valve 60 switches the passage to the junction P side or the compressor suction side between the normal operation and a defrosting operation of defrosting the air heat-source heat exchanger 5a. Note that, the arrows in FIG. 8 represent the flow of refrigerant in the defrosting operation.

In the defrosting operation, the four-way valve 2 is switched to the cooling operation side so that the air heat-source heat exchanger 5a may function as a condenser, and the three-way valve 60 is switched to the compressor suction side so that the underground heat-source heat exchanger 5b may function as an evaporator. In this manner, the refrigerant discharged from the compressor 1 flows into the air heat-source heat exchanger 5a to defrost the air heat-source heat exchanger 5a. Then, the refrigerant after the defrosting is depressurized by the expansion valve 4a, and thereafter branches into two passages. One flow of refrigerant flows through the water heat exchanger 3. The other flow of refrigerant flows through the expansion valve 4b, the underground heat-source heat exchanger 5b, and the three-way valve 60 in this order, and thereafter joins the refrigerant that has flown through the water heat exchanger 3. Then, the refrigerant passes through the refrigerant container 7a to be sucked into the compressor 1 again. Note that, also in this defrosting operation, the geothermal heat pump 22 is driven to collect underground heat in the underground heat source-side circuit 20, and the amount of the thus collected heat in addition to the amount of work of the compressor 1 can be used as the amount of heat for defrosting.

In the above-mentioned embodiment, the geothermal heat pump 22 is stopped when the air heat source is selected, and the fan 8 is stopped when the underground heat source is selected. Note that, however, the geothermal heat pump 22 and the fan 8 are not necessarily required to be stopped, and may be driven as necessary. For example, the geothermal heat pump 22 is regularly driven in order to prevent the freezing of the pipes of the underground heat source-side circuit 20. Further, the fan 8 may be driven in order to transfer heat from the substrate of the controller 30 or to detect a proper outside air temperature.

INDUSTRIAL APPLICABILITY

As an application example of the present invention, the present invention is effective for a heat pump apparatus including a large number of heat sources.

The invention claimed is:
1. A heat pump apparatus, comprising:
a refrigerant circuit including a first circuit and a second circuit,
the first circuit including
a compressor,
a refrigerant passage of a use-side heat exchanger,
a first pressure reducing device, and
a first heat-source heat exchanger configured to use outside air serving as a first heat source as a heat source,
the compressor, the refrigerant passage, the first pressure reducing device, and the first heat-source heat exchanger being sequentially connected,
the second circuit including:
a second pressure reducing device; and
a refrigerant passage of a second heat-source heat exchanger, the refrigerant passage being connected in series to the second pressure reducing device,
the second circuit being connected in parallel to the first pressure reducing device and the first heat-source heat exchanger of the first circuit;
a heat exchange medium circuit including a heat exchange medium passage of the second heat-source heat exchanger, and configured to circulate therethrough a heat exchange medium serving as a second heat source, the second heat source being used to exchange heat with another heat source other than the outside air so as to receive heat of the another heat source;
a controller configured to switch between a simultaneous operation of causing refrigerant to flow through both of the first heat-source heat exchanger and the second heat-source heat exchanger and a single operation of selecting the first heat-source heat exchanger or the second heat-source heat exchanger to cause refrigerant to flow therethrough, in accordance with a heat exchange amount in each of the first heat-source heat exchanger and the second heat-source heat exchanger;
a first heat source temperature detector configured to detect a temperature of the first heat source;
a second heat source temperature detector configured to detect a temperature of the second heat source; and
a storage device configured to store information for calculating current heat exchange performance of each of the first heat-source heat exchanger and the second heat-source heat exchanger,
wherein, when the controller switches the simultaneous operation to the single operation, the controller calculates the heat exchange amount in the each of the first heat-source heat exchanger and the second heat-source heat exchanger based on the information stored in the storage device, the temperature of the first heat source detected by the first heat source temperature detector, and the temperature of the second heat source detected by the second heat source temperature detector, and selects one of the first heat-source heat exchanger and the second heat-source heat exchanger that has a larger heat exchange amount.

2. The heat pump apparatus of claim 1, wherein, when the controller switches the simultaneous operation to the single operation, the controller selects the first heat-source heat exchanger when the heat exchange amount in the first heat-source heat exchanger is larger than the heat exchange amount in the second heat-source heat exchanger even if the temperature of the first heat source is lower than the temperature of the second heat source.

3. The heat pump apparatus of claim 1, wherein, when the controller switches the simultaneous operation to the single operation, the controller selects the second heat-source heat exchanger when the heat exchange amount in the second heat-source heat exchanger is larger than the heat exchange amount in the first heat-source heat exchanger even if the temperature of the second heat source is lower than the temperature of the first heat source.

4. The heat pump apparatus of claim 1, further comprising:
a fan configured to blow the first heat source to the first heat-source heat exchanger; and
a pump included in the heat exchange medium circuit, and configured to circulate the second heat source therethrough,
wherein the information stored in the storage device includes information necessary for calculating by conversion the heat exchange performance of the each of the first heat-source heat exchanger and the second heat-source heat exchanger by using current operating conditions including a rotation speed of the compressor, a rotation speed of the fan, and a rotation speed of the pump.

5. The heat pump apparatus of claim 1, wherein any one of geothermal heat, groundwater, seawater, solar-heated water, and a boiler is used as the another heat source.

6. A heat pump apparatus, comprising:
a refrigerant circuit including a first circuit and a second circuit,
the first circuit including
a compressor,
a refrigerant passage of a use-side heat exchanger,
a first pressure reducing device, and
a first heat-source heat exchanger configured to use outside air serving as a first heat source as a heat source,
the compressor, the refrigerant passage, the first pressure reducing device, and the first heat-source heat exchanger being sequentially connected,
the second circuit including:
a second pressure reducing device; and
a refrigerant passage of a second heat-source heat exchanger, the refrigerant passage being connected in series to the second pressure reducing device,
the second circuit being connected in parallel to the first pressure reducing device and the first heat-source heat exchanger of the first circuit;
a heat exchange medium circuit including a heat exchange medium passage of the second heat-source heat exchanger, and configured to circulate therethrough a heat exchange medium serving as a second heat source,
the second heat source being used to exchange heat with another heat source other than the outside air so as to receive heat of the another heat source;
a controller configured to switch between a simultaneous operation of causing refrigerant to flow through both of the first heat-source heat exchanger and the second heat-source heat exchanger and a single operation of selecting the first heat-source heat exchanger or the second heat-source heat exchanger to cause refrigerant to flow therethrough, in accordance with a heat exchange amount in each of the first heat-source heat exchanger and the second heat-source heat exchanger, wherein
when the controller switches the simultaneous operation to the single operation, the controller determines a magnitude difference of the heat exchange amount in the first heat-source heat exchanger and the heat exchange amount in the second heat-source heat exchanger based on comparison between an opening degree of the first pressure reducing device and an opening degree of the second pressure reducing device, and selects one of the first heat-source heat exchanger and the second heat-source heat exchanger that has a larger heat exchange amount.

7. A heat pump apparatus, comprising:
a refrigerant circuit including a first circuit and a second circuit,
the first circuit including
a compressor,
a refrigerant passage of a use-side heat exchanger,
a first pressure reducing device, and
a first heat-source heat exchanger configured to use outside air serving as a first heat source as a heat source,
the compressor, the refrigerant passage, the first pressure reducing device, and the first heat-source heat exchanger being sequentially connected,
the second circuit including:
a second pressure reducing device; and
a refrigerant passage of a second heat-source heat exchanger, the refrigerant passage being connected in series to the second pressure reducing device,
the second circuit being connected in parallel to the first pressure reducing device and the first heat-source heat exchanger of the first circuit;
a heat exchange medium circuit including a heat exchange medium passage of the second heat-source heat exchanger, and configured to circulate therethrough a heat exchange medium serving as a second heat source,
the second heat source being used to exchange heat with another heat source other than the outside air so as to receive heat of the another heat source;
a controller configured to switch between a simultaneous operation of causing refrigerant to flow through both of the first heat-source heat exchanger and the second heat-source heat exchanger and a single operation of selecting the first heat-source heat exchanger or the second heat-source heat exchanger to cause refrigerant to flow therethrough, in accordance with a heat exchange amount in each of the first heat-source heat exchanger and the second heat-source heat exchanger;
a first heat source temperature detector configured to detect a temperature of the first heat source;
a second heat source temperature detector configured to detect a temperature of the second heat source; and
a storage device configured to store information for calculating current heat exchange performance of each of the first heat-source heat exchanger and the second heat-source heat exchanger,
wherein, when the controller switches the simultaneous operation to the single operation, the controller is configured to:
calculate heat source-side heat exchange amounts based on an outlet/inlet temperature of a use-side heat medium flowing through a use-side circuit of the use-side heat exchanger, a flow rate of the use-side heat medium flowing through the use-side circuit, and an input of the compressor;
calculate a heat exchange amount in one of the first heat-source heat exchanger and the second heat-source heat exchanger based on the information stored in the storage device, the temperature of the first heat source detected by the first heat source temperature detector, and the temperature of the second heat source detected by the second heat source temperature detector; and
select one of the first heat-source heat exchanger and the second heat-source heat exchanger that has a larger heat exchange amount based on comparison between the heat source-side heat exchange amounts and the heat exchange amount in one of the first heat-source heat exchanger and the second heat-source heat exchanger.

* * * * *